US008289453B2

(12) United States Patent
Teragawa

(10) Patent No.: US 8,289,453 B2
(45) Date of Patent: Oct. 16, 2012

(54) METHOD FOR DRIVING A DISPLAY DEVICE, A DISPLAY DEVICE, AND A TELEVISION RECEIVER

(75) Inventor: Daisuke Teragawa, Tsu (JP)

(73) Assignee: Sharp Kabushiki Kaisha, Osaka (JP)

( * ) Notice: Subject to any disclaimer, the term of this patent is extended or adjusted under 35 U.S.C. 154(b) by 719 days.

(21) Appl. No.: 12/311,180

(22) PCT Filed: Apr. 18, 2007

(86) PCT No.: PCT/JP2007/058455
§ 371 (c)(1),
(2), (4) Date: Mar. 20, 2009

(87) PCT Pub. No.: WO2008/056457
PCT Pub. Date: May 15, 2008

(65) Prior Publication Data

US 2009/0262251 A1 Oct. 22, 2009

(30) Foreign Application Priority Data

Sep. 22, 2006 (JP) ................................ 2006-256598

(51) Int. Cl.
*H04N 5/14* (2006.01)

(52) U.S. Cl. ........ 348/671; 348/790; 348/725; 348/571; 348/656; 348/729; 348/569; 348/553; 345/89; 345/204; 345/87; 345/690

(58) Field of Classification Search .................. 348/790, 348/725, 553, 569, 571, 656, 729, 671; 345/89, 345/204, 87, 690
See application file for complete search history.

(56) References Cited

U.S. PATENT DOCUMENTS 6,297,813 B1 * 10/2001 Okada et al. .................. 345/204
(Continued)

FOREIGN PATENT DOCUMENTS

CN 1536554 10/2004
(Continued)

OTHER PUBLICATIONS

Notice on the First Office Action for corresponding Chinese patent application No. 200780035203.2 dated Apr. 1, 2011 (with English translation).

*Primary Examiner* — Jefferey Harold
*Assistant Examiner* — Mustafizur Rahman
(74) *Attorney, Agent, or Firm* — Harness, Dickey & Pierce

(57) ABSTRACT

In one embodiment of the present invention, a method is disclosed for driving a display device by which display of a moving image with natural movement is achieved while occurrence of flicker is minimized or prevented. The method for driving a display device includes a display screen where pixels are arranged in a matrix includes inputting image signals for one frame into the display device at established intervals, writing a gray level in accordance with the signal in each of the pixels, and displaying an image on the screen, wherein interpolation is performed between a first gray level of each of the pixels in accordance with an image signal inputted in a given frame, and a second gray level of each of the pixels in accordance with an image signal inputted in a next frame, whereby the gray level of each of the pixels continuously changes from the first gray level to the second gray level.

12 Claims, 11 Drawing Sheets

U.S. PATENT DOCUMENTS

| | | | | |
|---|---|---|---|---|
| 6,396,469 | B1 | 5/2002 | Miwa et al. | |
| 6,785,425 | B1 * | 8/2004 | Feder et al. | 382/247 |
| 6,912,017 | B1 * | 6/2005 | Minami et al. | 348/743 |
| 2004/0196254 | A1 * | 10/2004 | Mizumaki | 345/103 |
| 2004/0196274 | A1 * | 10/2004 | Song et al. | 345/204 |
| 2006/0152443 | A1 * | 7/2006 | Song et al. | 345/63 |
| 2006/0152535 | A1 * | 7/2006 | Huang et al. | 345/690 |
| 2006/0164687 | A1 * | 7/2006 | Huang et al. | 358/3.01 |
| 2006/0290794 | A1 * | 12/2006 | Bergman et al. | 348/246 |

FOREIGN PATENT DOCUMENTS

| | | |
|---|---|---|
| JP | 6-318050 | 11/1994 |
| JP | 06-318050 | 11/1994 |
| JP | 11-109921 | 4/1999 |
| JP | 2000-293142 | 10/2000 |
| JP | 2004-304390 | 10/2004 |
| JP | 2006-330311 | 12/2006 |
| JP | 2007-078860 | 3/2007 |

* cited by examiner

METHOD FOR DRIVING A DISPLAY DEVICE, A DISPLAY DEVICE, AND A TELEVISION RECEIVER

BACKGROUND OF THE INVENTION

1. Field of the Invention

The present invention relates to a method for driving a display device, especially a hold-type display device such as a liquid crystal display device, a display device which is driven by the driving method, and a television receiver having the display device.

2. Description of the Related Art

In recent years, instead of a cold cathode ray tube (hereinafter, referred to as CRT), a display device which performs display by electro-optical conversion such as a liquid crystal display (hereinafter, referred to as LCD) panel is widely used in various types of electric and electronic equipment including a television receiver, exploiting its characteristics such as thinness and lower power consumption.

Generally in the above-described display device, image signals for one screen (frame) are inputted at established intervals (e.g., at 60 Hz in the case of television transmission), and accordingly images corresponding to the image signals are displayed one after another. The image of one frame is displayed such that pixels arranged in a matrix in a display screen are successively selected and gray levels in accordance with the image to be displayed on the display screen are written in the pixels.

In a so-called "impulse-type" display device typified by a CRT, pixels which are successively selected in a frame Fn are arranged such that when gray levels in accordance with an image signal for the frame Fn are written in the pixels, fluorescence substances emit light at brightness levels corresponding to the gray levels only for a very short time, and then the brightness levels decay until gray levels for a next frame F(n+1) are written in the pixels as shown in FIG. 13A.

Meanwhile, generally in a so-called "hold-type" display device typified by an LCD panel, pixels which are successively selected in a frame Fn are arranged such that when gray levels in accordance with an image signal for the frame Fn are written in the pixels, the pixels perform display at brightness levels corresponding to the gray levels and the display is maintained in this state until gray levels for a next frame F(n+1) are written in the pixels. In the pixels in this type of display device, the display at the brightness levels corresponding to the gray levels for the previous frame Fn is continued until the gray levels for the next frame F(n+1) are written as shown in FIG. 13B.

FIGS. 14A and 14B are views schematically showing changes in display state in the case of displaying moving images on screens of the above-described display devices of different type. Shown in FIG. 14A are the changes in display state for every 1/240 second in displaying an image of 60 frames/second in the impulse-type display device, and shown in FIG. 14B are the changes in display state for every 1/240 second in displaying an image of 60 frames/second in the hold-type display device.

In the impulse-type display device, an operation such that the image of each frame is displayed and disappears momentarily (i.e., the screen is displayed in black) is repeated successively. For example, as shown in FIG. 14A, in the frame Fn that is an $n^{th}$ frame, a black square 92 is displayed at a position Xn against a white background on a display screen 90 and then nothing is displayed there (i.e., the screen is displayed in black). Then, in the next frame F(n+1) that is an $(n+1)^{th}$ frame, the black square 92 is displayed at a position X(n+1) against the white background. This creates an illusion of smooth moving of the black square 92 from the position Xn to the position X(n+1) taking 1/60 second for a viewer of the display screen 90. Thus, in the impulse-type display device, there is an advantage that the moving image is perceived to be smoothly moving as described above; however, there is a problem that flicker occurs in the display screen 90 to easily cause eyestrain to the viewer.

Meanwhile, in the hold-type display device such as an LCD panel, as shown in FIG. 14B, a black square 96 is displayed at a position Xn against a white background on a display screen 94 in the frame Fn that is an $n^{th}$ frame, is continued to be displayed at the position Xn until just before the frame is advanced to the next frame F(n+1) that is an $(n+1)^{th}$ frame, and is then displayed at a position X(n+1) against the white background in the next frame F(n+1). Thus, in the hold-type display device, there is no problem that flicker occurs in the display screen 94 because there is no period during which no image is displayed (i.e., there is no period during which the screen is displayed in black); however, there is a problem that the moving image suffers unnatural movement since the image of the previous frame is displayed until just before the image of the next frame is displayed and accordingly the frame is momentarily advanced from the previous frame to the next frame.

In order to solve the above-described problems, there is a method of alternately repeating a period during which a gray scale voltage in accordance with an image signal is applied to each pixel electrode in an LCD panel and a period during which a gray scale voltage corresponding to a black level is applied thereto (see, Japanese Patent Application Unexamined Publication No. Hei11-109921). In addition, there is a method of repeating in one frame period an operation of turning off a backlight to display in black during a period of writing a gray scale voltage in each pixel in an LCD panel and turning on the backlight during the other periods (see, Japanese Patent Application Unexamined Publication No. 2000-293142).

However, performing such pseudo impulse-type display by the hold-type display device and providing in each frame period the period during which no image is displayed (i.e., the screen is displayed in black) as described above causes not only a problem of losing the advantage of the hold-type display device such that no flicker occurs in the screen but also a problem of decreasing the brightness levels resulting from a short image display time.

SUMMARY OF THE INVENTION

In order to overcome the problems described above, preferred embodiments of the present invention provide a method for driving a hold-type display device such as a liquid crystal display device, by which display of a moving image with natural movement can be achieved while occurrence of flicker in a screen of the display device is minimized or prevented, a display device and a television receiver by which such display is achieved.

To achieve the objects and in accordance with the purpose of the present invention, a method for driving a display device having a display screen in which a plurality of pixels are arranged in a matrix includes the steps of inputting image signals for one frame into the display device at established intervals, writing a gray level in accordance with the image signal in each of the pixels, and displaying an image on the display screen, wherein interpolation is performed between a first gray level of each of the pixels in accordance with an image signal inputted in a given frame and a second gray level of each of the pixels in accordance with an image signal inputted in a next frame, whereby the gray level of each of the pixels continuously changes from the first gray level to the second gray level.

In this case, it is preferable that the interpolation is performed between the first gray level and the second gray level by using a linear function.

It is also preferable that the interpolation is performed between the first gray level and the second gray level by circular interpolation based on a plurality of gray levels including the first gray level and the second gray level.

It is also preferable that the interpolation is performed between the first gray level and the second gray level by selectively using different functions according to a difference between the first gray level and the second gray level.

It is also preferable that the interpolation is performed between the first gray level and the second gray level by using different functions depending on whether the gray level goes up or goes down during a period when the gray level changes from the first gray level to the second gray level.

In another aspect of the present invention, a display device which is driven by the above-described driving method includes interpolation mechanisms provided to the individual pixels, each of the interpolation mechanisms arranged to perform the interpolation between the first gray level of the pixel in accordance with the image signal inputted in the given frame, and the second gray level of the pixel in accordance with the image signal inputted in the next frame, whereby the gray level of the pixel continuously changes from the first gray level to the second gray level.

In this case, it is preferable that a liquid crystal display panel in which a liquid crystal is sandwiched between a pair of substrates includes the above-described display screen.

It is also preferable that light-emitting diodes are arranged in a matrix as the above-described pixels.

Yet, in another aspect of the present invention, a television receiver includes the above-described display device as a display mechanism.

According to the above-described method for driving a display device, since the interpolation is performed between the first gray level of each of the pixels in accordance with the image signal inputted in the given frame and the second gray level of each of the pixels in accordance with the image signal inputted in the next frame whereby the gray level of each of the pixels continuously changes from the first gray level to the second gray level, the displayed image gradually changes from the image of the given frame to the image of the next frame. Accordingly, a problem that a moving image suffers unnatural movement which results from momentary change from an image of a given frame to an image of a next frame is solved, and display of a moving image with smooth natural movement can be achieved. In addition, there is no period during which no image is displayed (i.e., there is no period during which the display screen is displayed in black), so that occurrence of flicker in the display screen can be minimized or prevented.

According to the above-described display device, since the interpolation mechanisms are provided to the individual pixels and the interpolation is performed, with the use of each of the interpolation mechanisms, between the first gray level of the pixel in accordance with the image signal inputted in the given frame and the second gray level of the pixel in accordance with the image signal inputted in the next frame whereby the gray level of each of the pixels continuously changes from the first gray level to the second gray level, the same effect as the above-described method for driving a display device can be obtained. In addition, since the interpolation mechanisms are provided to the individual pixels, it is essential only that each of the interpolation mechanisms should perform processing on the gray level of the pixel, and there is no need to perform complex processing such as performing interpolation on gray levels of a plurality of pixels.

According to the above-described television receiver, since it includes the above-described display device, an effect of the display device is produced to achieve a moving image with natural movement without unnatural movement in displaying a moving image with fast movement such as a moving image displayed at the time of sports broadcasting.

DETAILED DESCRIPTION OF PREFERRED EMBODIMENTS

A detailed description of a liquid crystal display device which is driven by a method for driving a display device according to a preferred embodiment of the present invention will now be provided with reference to the accompanying drawings. Hereinafter, an image signal to be inputted into the liquid crystal display device defines an image signal used in a line-sequential scanning system in which the image signal is decomposed into serial signals along a time axis, and the serial signals are rearranged in a two-dimensional image signal so as to display an image on a screen. In addition, hereinafter, one image displayed on a display screen of the display panel is referred to as “one frame”, the image being displayed such that when an image signal is inputted into a controller of the liquid crystal display device, pixels arranged in a matrix in an LCD panel are successively selected and gray levels in accordance with the above-described image signal are inputted in the pixels. A period starting from the time when a given pixel is selected to the time when the given pixel is selected again is referred to as “a frame period”, and the inverse of the frame period is referred to as “a frame frequency”.

Figure 1:
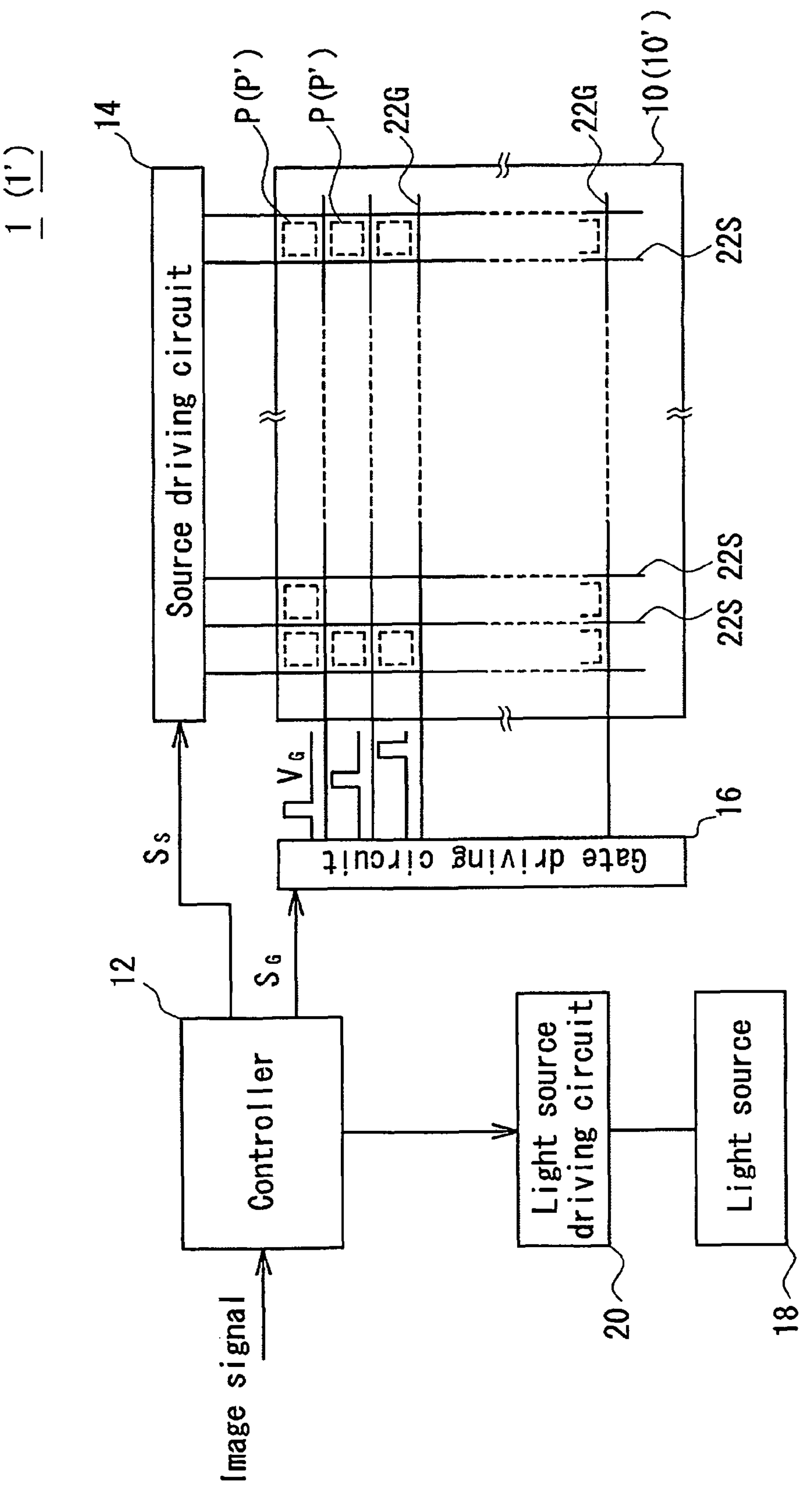
FIG. 1 is a control block diagram of a liquid crystal display device which is driven by a method for driving a display device according to a preferred embodiment of the present invention.

As shown in FIG. 1, a liquid crystal display device 1 includes an LCD panel 10 in which a plurality of pixels Pare arranged in a matrix in a display screen, a controller 12 arranged to control a display state of the LCD panel 10 based on an image signal inputted from the outside, a source driving circuit 14 arranged to generate a source voltage from a source signal which is inputted from the controller 12 and apply the source voltage to the LCD panel 10, and a gate driving circuit 16 arranged to generate a gate voltage from a gate signal which is inputted from the controller 12 and apply the gate voltage to the LCD panel 10. Light sources 18 arranged to irradiate illumination light onto the LCD panel 10 are provided behind the LCD panel 10. A light source driving circuit 20 arranged to drive the light sources 18 is connected to the controller 12.

A plurality of gate lines 22G corresponding to rows of the pixels P arranged in the matrix in the display screen of the LCD panel 10 are provided in a row direction of the matrix, and a plurality of source lines 22S corresponding to columns of the pixels P are provided in a column direction of the matrix. The gate lines 22G and the source lines 22S are connected to switching elements (not shown) provided to the individual pixels P. Further, the gate lines 22G are connected to the gate driving circuit 16, and the source lines 22S are connected to the source driving circuit 14.

The controller 12 is arranged to feed, upon being fed the image signal, the gate driving circuit 16 gate signals $S_G$ for successively selecting the gate lines 22G, and the source driving circuit 14 source signals $S_S$ for designating gray levels of the pixels P in the row of the gate line 22G selected by the gate signal $S_G$.

The gate driving circuit 16 is arranged to apply a gate voltage $V_G$ to the gate line 22G selected by the gate signal $S_G$ to bring the switching elements connected to the gate line 22G to an ON-state, and the source driving circuit 14 is arranged to apply source voltages $V_S$ to the pixels P in the selected row of the gate line 22G so as to perform display at brightness levels corresponding to the gray levels designated by the source signals $S_S$.

Figure 2:
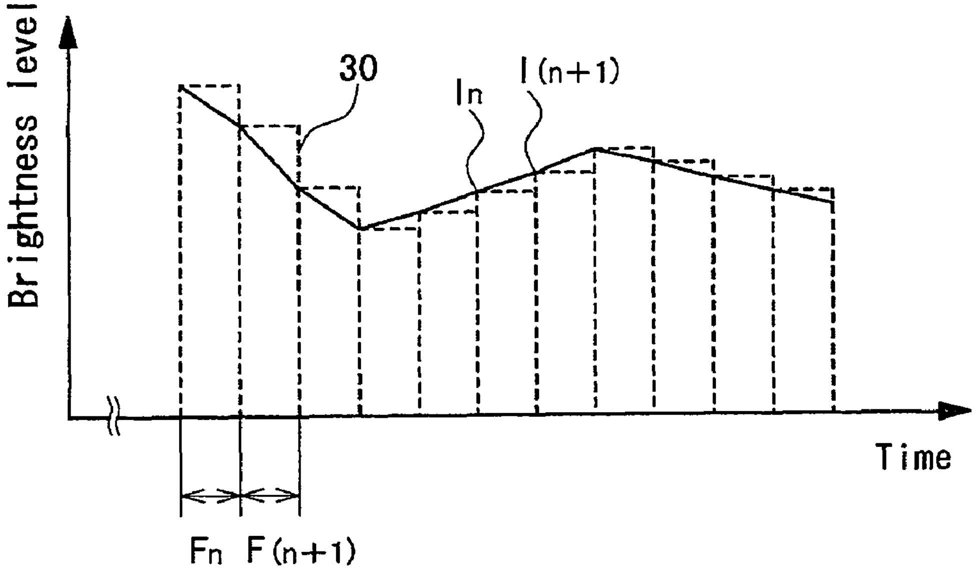
FIG. 2 is a view for illustrating a method for performing interpolation on brightness levels of each of pixels in a display screen of the liquid crystal display device.

A description of changes in brightness level of a given pixel P in the liquid crystal display device 1 which is driven by the driving method according to the preferred embodiment of the present invention is provided referring to FIG. 2. Besides, in FIG. 2, indicated with the broken line 30 are changes in brightness level of the given pixel P in a general method for driving a liquid crystal display device. In this driving method, gray levels are written at established frame intervals, and when a gray level for a given frame is written, a brightness level corresponding to the gray level is maintained until a gray level for a next frame is written. Accordingly, when the gray level for the next frame is written to perform display at a brightness level corresponding to the gray level, a steep change in brightness level occurs in the given pixel P. Meanwhile, in FIG. 2, indicated with the full line are the changes in brightness level of the given pixel P in the driving method according to the preferred embodiment of the present invention. In this driving method, interpolation is performed between a gray level In (a first gray level) which is written in the pixel P for a given frame and a gray level I(n+1) (a second gray level) which is written in the pixel P for a next frame by using a linear function, and continuous changes in brightness level occur in the pixel P.

Next, a description of changes in display state of a display screen 32 as a whole in the case of the above described continuous changes in brightness level occurring in the pixels is provided referring to FIGS. 3A to 3E. In FIGS. 3A to 3E, an image is displayed such that a black square 34 moves from the left to the right against a white background. FIGS. 3A to 3E are views schematically showing frame-by-frame changes in display state for every 1/240 second in displaying the above-described image.

Figures 3A, 3B, 3C:
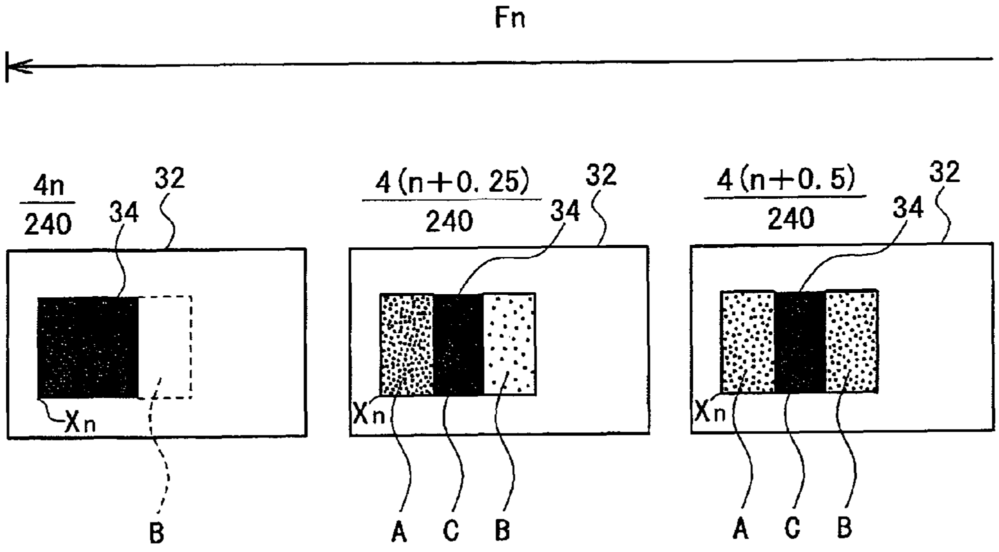
FIGS. 3A to 3E are views schematically showing frame-by-frame changes in display state of the display screen of the liquid crystal display device.
Figures 3D, 3E:
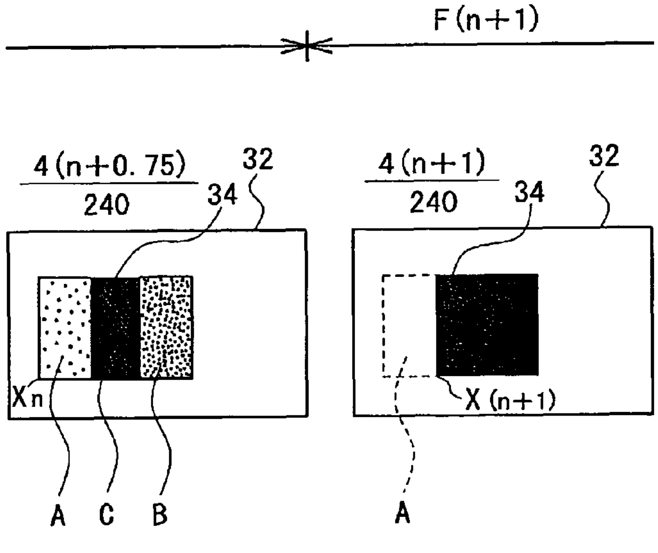

As shown in FIG. 3A, the black square 34 is displayed at a position Xn in the beginning of a frame Fn that is an $n^{th}$ frame (in the $4n^{th}/240$ second), and then as shown in FIG. 3E, the black square 34 is displayed at a position X(n+1) in the beginning of a next frame F(n+1) that is the $(n+1)^{th}$ frame (in the $4(n+1)^{th}/240$ second).

Concerning the process of the changes in display state shown in FIGS. 3A to 3E, while the display state shown in FIG. 3A is maintained until the display state shown in FIG. 3E is made in the case of the general driving method, the continuous changes in brightness level from a gray level for the $n^{th}$ frame to a gray level for the $(n+1)^{th}$ frame occur in each of the pixels in the case of the driving method according to the preferred embodiment of the present invention, so that gradual changes in brightness levels occur in the pixels in regions which are in the square 34 at the position Xn and the square 34 at the position X(n+1) and do not overlap with each other.

To be more specific, among the pixels which perform display in black in the $4n^{th}/240$ second (see FIG. 3A), the pixels which perform display in white in the $4(n+1)^{th}/240$ second (i.e., the pixels in a region A) (see FIG. 3E) gradually change from the display in black to the display in white while performing display in dark gray in the $4(n+0.25)^{th}/240$ second (see FIG. 3B). In contrast to this, among the pixels which perform display in white in the $4n^{th}/240$ second (i.e., the pixels in a region B) (see FIG. 3A), the pixels which perform display in black in the $4(n+1)^{th}/240$ second (see FIG. 3E) gradually change from the display in white to the display in black while performing display in light gray in the $4(n+0.25)^{th}/240$ second (see FIG. 3B). The pixels in a region C which is an overlapping region between the square 34 at the position Xn and the square 34 at the position X(n+1) continue to perform display in black.

Then, the pixels in the region A get lighter in the course of changing to the display in white while the pixels in the region B get darker in the course of changing to the display in black, and in the $4(n+0.5)^{th}/240$ second (see FIG. 3C), the pixels in the region A and the pixels in the region B perform display in gray at almost the same brightness levels. After a lapse of time, in the $4(n+0.75)^{th}/240$ second (see FIG. 3D), the pixels in the region A is much lighter while the pixels in the region B is much darker. Thereafter, in the $4(n+1)^{th}/240$ second (see FIG. 3E), the pixels in the region A perform the display in white while the pixels in the region B perform the display in black, and thus the black square 34 is displayed at the position X(n+1).

As described above, in displaying the image such that the black square 34 moves from the position Xn to the position X(n+1), the regions at both sides of the overlapping region between the square 34 at the position Xn and of the square 34 at the position X(n+1) are displayed in gray through the $4n^{th}/240$ second to the $4(n+1)^{th}/240$ second, so that the gray-displayed regions are visually perceived as image retention occurring along a path where the black square 34 moves. According to the above-described driving method, a problem that a moving image suffers unnatural movement is solved since the display such that the square moves momentarily from the $n^{th}$ frame to the $(n+1)^{th}$ frame as in the general driving method is not performed.

Therefore, according to the driving method according to the preferred embodiment of the present invention, in displaying a moving image, the edge of a displayed object is moderately blurred in a moving direction and is displayed like a path, so that display of a moving image with natural movement can be achieved. In addition, since processing such as inserting black displays in each frame is not performed, there is no problem of occurrence of flicker or no problem of decreasing brightness levels resulting in a dark display screen.

Figure 4:
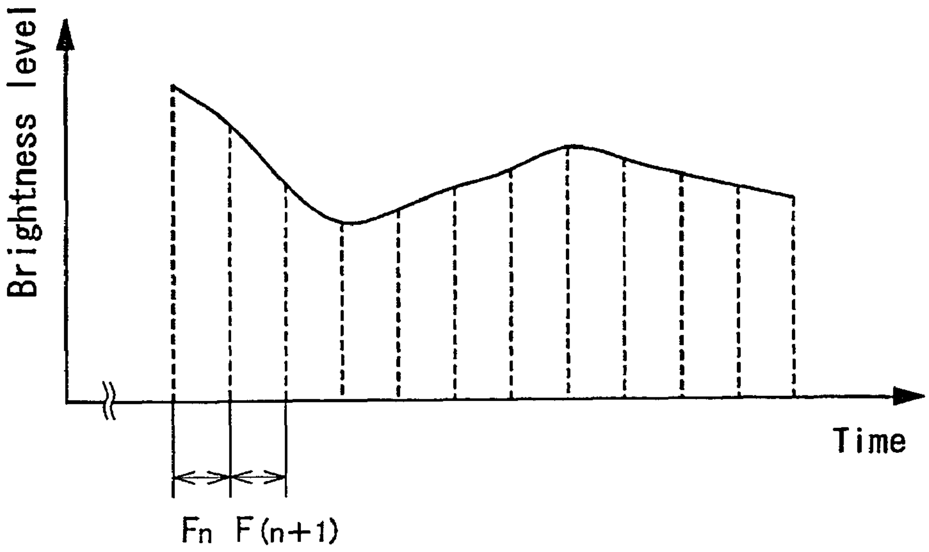
FIG. 4 is a graphic plot of a first modified example of changes in brightness level of the pixel shown in FIG. 2.

In the preferred embodiment of the present invention, the description of performing the interpolation between the gray level for the $n^{th}$ frame (the first gray level) and the gray level for the $(n+1)^{th}$ frame (the second gray level) by using the linear function is provided as an example; however, the interpolation is not limited to a linear function, and it is also preferable to perform the interpolation by using another function. For example, as shown in FIG. 4, circular interpolation may be performed between the gray levels. It is also preferable to perform interpolation between the gray level for the $n^{th}$ frame and the gray level for the $(n+1)^{th}$ frame referring to gray levels for a few frames prior to and subsequent to the gray levels for the $n^{th}$ frame and the $(n+1)^{th}$ frame.

Figure 5:
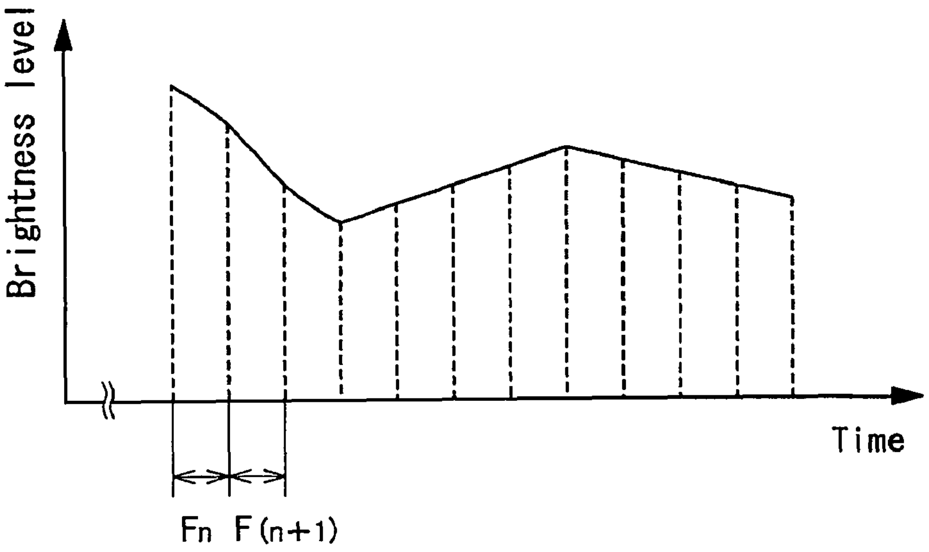
FIG. 5 is a graphic plot of a second modified example of the changes in brightness level of the pixel shown in FIG. 2.

It is also preferable that, as shown in FIG. 5, interpolation is performed between the first gray level and the second gray level by using different functions according to a difference (an amount of change) between the first gray level and the second gray level. For example, when the difference is small, interpolation is performed between the first gray level and the second gray level by using a linear function, and when the difference is large, circular interpolation is performed between the first gray level and the second gray level.

Figure 6:
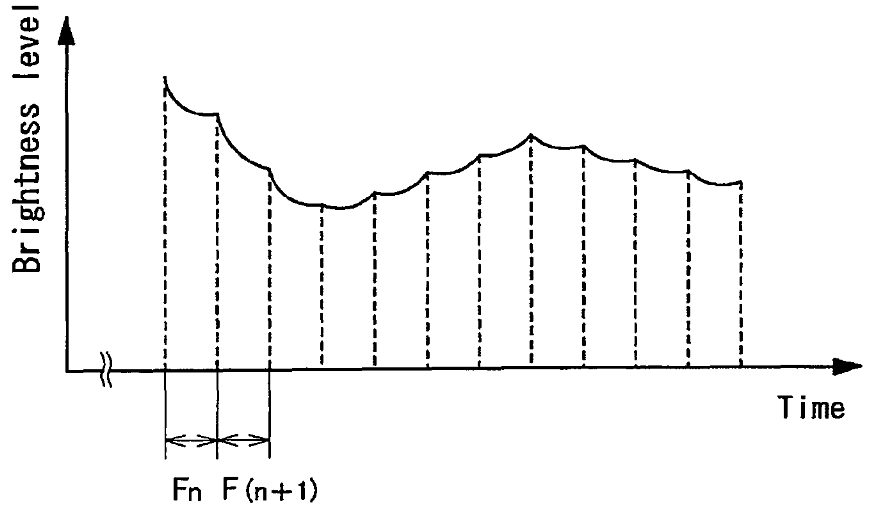
FIG. 6 is a graphic plot of a third modified example of the changes in brightness level of the pixel shown in FIG. 2.

It is also preferable that, as shown in FIG. 6, interpolation is performed between the first gray level and the second gray level by using different functions depending on whether the gray level goes up or goes down. For example, in a case where the gray level goes up, the gray level changes gradually in the first half of a period during which the gray level changes from the first gray level to the second gray level, and changes abruptly in the latter half of the period. In a case where the gray level goes down, the gray level changes abruptly in the first half of the period and changes gradually in the latter half of the period.

Figure 7:
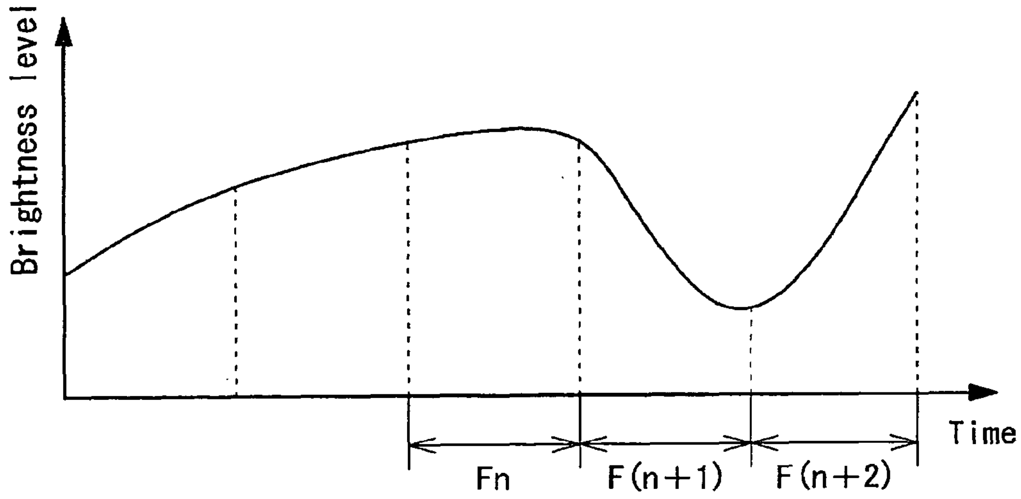
FIG. 7 is a graphic plot of a fourth modified example of the changes in brightness level of the pixel shown in FIG. 2.

It is also preferable that, as shown in FIG. 7, interpolation is performed by using a quadratic function referring to the gray level for the $n^{th}$ frame (the first gray level), the gray level for the $(n+1)^{th}$ frame (the second gray level) and a gray level for an $(n+2)^{th}$ frame (a third gray level), so that the gray level continuously changes from the first gray level to the second gray level.

Figure 8:
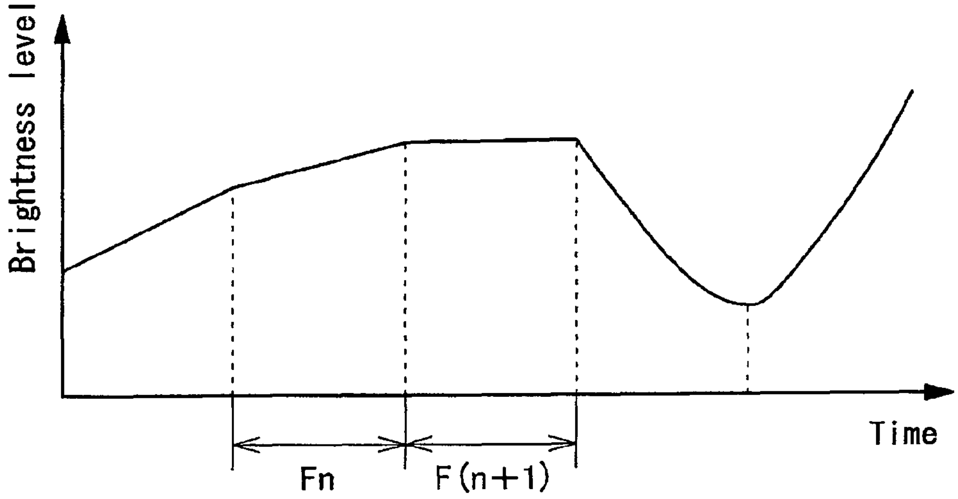
FIG. 8 is a graphic plot of a fifth modified example of the changes in brightness level of the pixel shown in FIG. 2.

It is also preferable that, as shown in FIG. 8, interpolation is performed by using a linear function in a case where a difference between the gray level for the $n^{th}$ frame (the first gray level) and the gray level for the $(n+1)^{th}$ frame (the second gray level) is large, and by using a given function of the $n^{th}$ order in a case where the difference is small.

Figure 9:
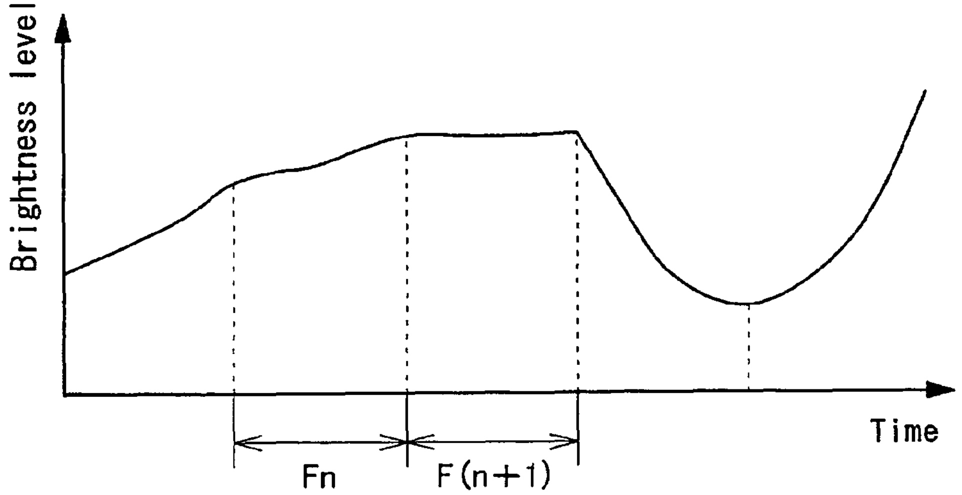
FIG. 9 is a graphic plot of a sixth modified example of the changes in brightness level of the pixel shown in FIG. 2.

It is also preferable that, as shown in FIG. 9, interpolation is performed such that the gray level which goes up changes slowly in the beginning of the period during which the gray level changes from the first gray level to the second gray level, and the gray level which goes down changes quickly in the beginning of the period.

Next, a description of a display device according to a preferred embodiment of the present invention will be provided. The present display device is arranged to be driven by the driving method according to the above-described preferred embodiment of the present invention, and is provided with interpolation mechanisms each arranged to perform the interpolation between the gray level for the $n^{th}$ frame and the gray level for the $(n+1)^{th}$ frame which are stored in a memory.

Figure 10:
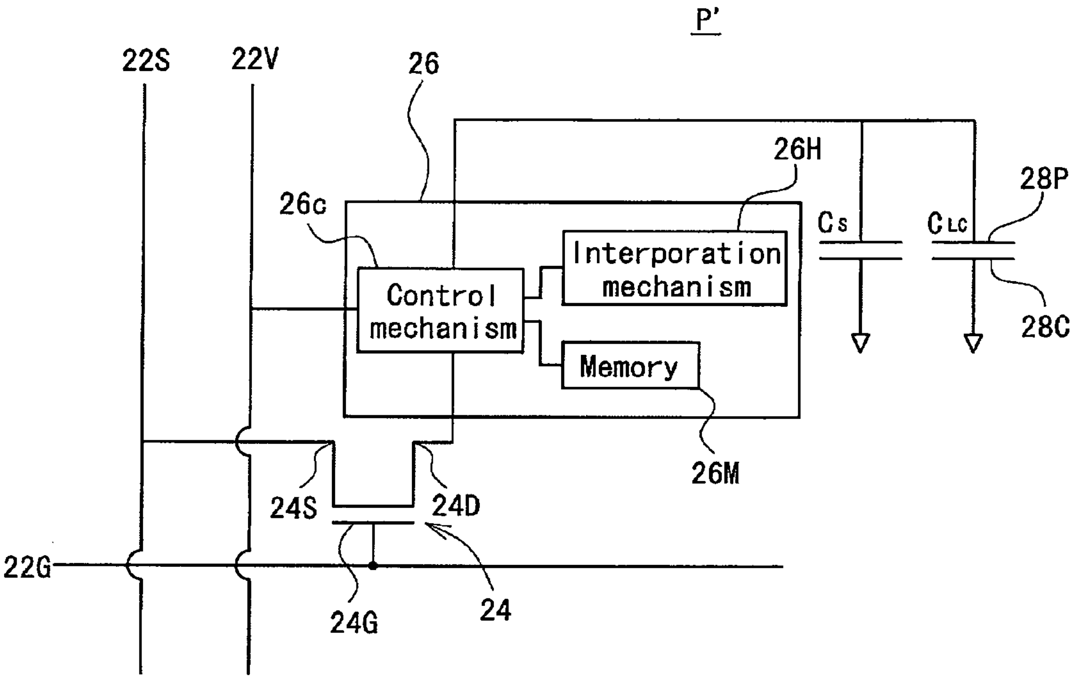
FIG. 10 is a block diagram of a configuration of one pixel in a display device according to a preferred embodiment of the present invention.

FIG. 10 is a block diagram of a configuration of one pixel of pixels P' which are arranged in a matrix in an LCD panel 10' of a display device 1'. The display device 1' has a configuration substantially same as the display device 1 shown in FIG. 1, so that an explanation is given providing reference numerals same as those of the display device 1 to the same members.

Thin film transistors (TFTs) 24 that define switching elements are provided to the individual pixels P', and the TFTs 24 are connected to the gate lines 22G and the source lines 22S. Ends of the gate lines 22G and ends of the source lines 22S are connected to the gate driving circuit 16 and the source driving circuit 14, respectively (see FIG. 1). The gate driving circuit 16 is arranged to successively select the gate lines 22G based on the gate signals $S_G$ from the controller 12 and apply the gate voltage $V_G$ to the TFTs 24 of the pixels P' connected to the selected gate line 22G, and the source driving circuit 14 is arranged to feed, based on the source signals $S_S$ from the controller 12, signals Si for indicating gray levels (gray scale signals Si) of the pixels P' to which the gate voltage $V_G$ is applied into those pixels P'.

Each of the TFTs 24 is further connected, via a gray scale voltage generator 26, to a liquid crystal capacitance $C_{LC}$ of a liquid crystal which is sandwiched between a pixel electrode 28*p* and a common electrode 28*c*, and to an auxiliary capacitance $C_S$, so that the TFTs 24 are each arranged such that a brightness level (a gray level) at which its pixel performs display is adjusted by a gray scale voltage $V_i$ which is outputted from the gray scale voltage generator 26 and applied to the pixel electrode 28*p*.

Each of the gray scale voltage generators 26 includes a control mechanism 26*c*, an interpolation mechanism 26H and a memory 26M. The control mechanisms 26*c* each have the functions of controlling signal input and signal output of the memory 26M and the interpolation mechanism 26H, and controlling the voltage to be applied to the pixel electrode 28*p*. The interpolation mechanisms 26H are each arranged to perform interpolation between the first gray level and the second gray level and generate a gray scale signal Si which continuously changes. The memories 26M each define a storage mechanism arranged to store the first gray level. Further, lines 22V for the gray scale voltage generators 26 which are arranged to supply voltages necessary to operate the gray scale voltage generators 26 are provided in the LCD panel 10' and are connected to the control mechanisms 26*c*.

In the $n^{th}$ frame, when one gate line 22G is selected and the gate voltage $V_G$ is applied to gate electrodes 24G of the TFTs 24 of the pixels P' connected to the selected gate line 22G, the gray scale signals Si which correspond to the gray levels for the $n^{th}$ frame (the first gray levels) are fed into the gray scale voltage generators 26 positioned at the side of the drain electrodes 24D of the TFTs 24. The fed gray scale signals Si are stored in the memories 26M via the control mechanisms 26*c*.

In the next $(n+1)^{th}$ frame, when the above-selected gate line 22G is selected again, the gray scale signals Si which correspond to the gray levels for the $(n+1)^{th}$ frame (the second gray levels) are fed into the gray scale voltage generators 26. The fed scale signals Si are stored in the memories 26M via the control mechanisms 26*c*. Then, the control mechanisms 26*c* of the gray scale voltage generators 26 feed the interpolation mechanisms 26H the first gray levels and the second gray levels stored in the memories 26M.

When fed the first gray levels and the second gray levels, the interpolation mechanisms 26H perform the interpolation between the first gray levels and the second gray levels by using the predetermined function and generate the gray scale signals Si which continuously change. The control mechanisms 26*c* control the grayscale voltages $V_i$ to be applied to the liquid crystal capacitances $C_{LC}$ such that the pixels P' perform display at gray levels corresponding to their respective gray scale signals Si which are generated by the interpolation mechanisms 26H.

In order to apply the gray scale voltages $V_i$ which correspond to the gray levels at which the pixels P' perform display, it is necessary to previously grasp correlations between the gray scale voltages $V_i$ and the gray levels, which differ according to a structure or a cell gap of the display device, a response time of the liquid crystal itself or other factors. The correlations are specifically grasped by previously making measurements as to at which gray level each of the pixels P' performs the display by applying which gray scale voltage $V_i$. Then, based on a correlation function obtained by results of the measurements, the control mechanisms 26*c* find the gray scale voltages $V_i$ corresponding to the gray scale signals Si.

It is also preferable that the interpolation mechanisms 26H each incorporate an electronic circuit prepared by combining electronic components as appropriate in accordance with a function to be used in performing interpolation, or that the interpolation mechanisms 26H are each provided with an interpolation table and a level which is determined based on the first and second gray levels is called up from the table. The interpolation table can be provided external to the pixels so as to be shared by the pixels.

According to the above-described display device, since each of the pixels in the display device includes the gray scale voltage generator having the interpolation mechanism, it is essential only that the interpolation mechanism should perform relatively simple processing such as performing the interpolation between the first gray level and the second gray level of the pixel, and there is no need to provide a complex device arranged to perform batch processing on gray levels of a plurality of pixels.

Figure 11:
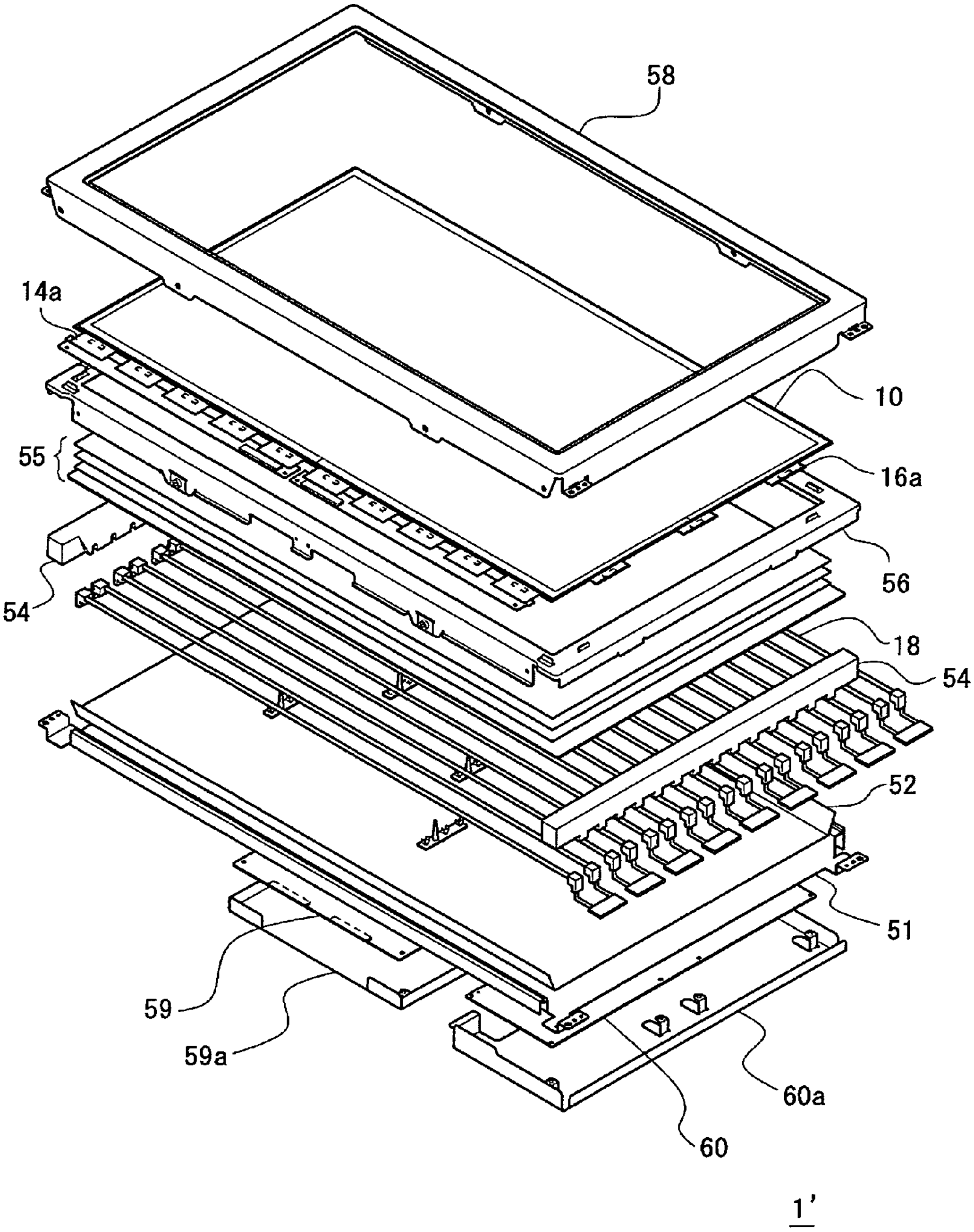
FIG. 11 is an exploded perspective view schematically showing a structure of the display device.

Next, a description of the structure of the display device 1' will be provided. FIG. 11 is an exploded perspective view schematically showing the structure of relevant part of the display device 1'. In FIG. 11, the front side of the display device 1' faces toward the top of FIG. 11, and the back side faces toward the bottom of FIG. 11.

As shown in FIG. 11, the display device 1' has a chassis 51, a reflection sheet 52, the light sources 18, side holders 54, optical sheets 55, a frame 56, the LCD panel 10', a bezel 58, a light source driving circuit board 60, a light source driving circuit board cover 60*a*, a drive control circuit board 59 and a drive control circuit board cover 59*a*.

The chassis 51, the reflection sheet 52, the light sources 18, the side holders 54, the optical sheets 55, the frame 56, the LCD panel 10', the bezel 58, the light source driving circuit board cover 60*a* and the drive control circuit board cover 59*a* may be conventional ones, and therefore, brief descriptions thereof are given and detailed descriptions thereof are omitted.

The chassis 51 is a substantially plate-shaped member, which is preferably prepared by subjecting a metal plate to press working.

For the light sources 18, a variety of known light sources such as a fluorescent lamp including a cold cathode tube and a hot cathode tube, a discharge tube including a xenon tube, and a light emitting element including an LED are preferably used. In the present preferred embodiment of the present invention, linear cold cathode tubes are preferably used for the light sources 18.

The reflection sheet 52 is a sheet-shaped or plate-shaped member having a surface property of reflecting light emitted by the light sources 18 diffusely. The reflection sheet 52 is preferably made of expanded PET (polyethylene terephthalate).

The side holders 54 function as spacers for the optical sheets 55 to be described later. The side holders 54 are substantially in the shape of a bar and are preferably unitary molded members made of a resin material.

The optical sheets 55 are defined by a sheet-shaped or plate-shaped member arranged to control the property of light emitted by the light sources 18, or an assembly of such members. The optical sheets 55 preferably include a diffusion plate, a diffusion sheet, a polarizing reflection sheet and a lens sheet. In general, these sheets are stacked.

The frame 56 holds and/or protects the optical sheets 55 and the LCD panel 10'. The frame 56 is substantially in the shape of a square with an opening, which may be a unitary molded member made of a resin material, an assembly of components made of a resin material, a metal plate member prepared by subjecting a metal plate material to press working, or an assembly of components prepared by subjecting a metal plate material to press working.

The light source driving circuit board 60 incorporates the light source driving circuit 20 and other components. The light source driving circuit board cover 60*a* is a plate-shaped member arranged to cover the light source driving circuit board 60 and is preferably made of a metal plate material.

A circuit board 16*a* (including a film circuit board) incorporating the gate driving circuit 16, and a circuit board 14*a* (including a film circuit board) incorporating the source driving circuit 14 are attached to outer edges of the LCD panel 10' as shown in FIG. 11.

The bezel 58 holds and/or protects the LCD panel 10' and is a member substantially in the shape of a square with an opening. The bezel 58 may be a unitary molded member made of a resin material, an assembly of components made of a resin material, a metal plate member prepared by subjecting a metal plate material to press working, or an assembly of components prepared by subjecting a metal plate material to press working.

The drive control circuit board 59 incorporates the controller 12 and other components. The drive control circuit board cover 59*a* is a plate-shaped member arranged to cover the drive control circuit board 59 and is preferably made of a metal plate material.

The display device 1' including the above-described constituent elements is assembled as follows.

The reflection sheet 52 is laid on a front surface of the chassis 51. The light sources 18 are placed on a front surface of the reflection sheet 52, and the side holders 54 are attached to the ends of the light sources 18 so as to cover them. The optical sheets 55 are placed on the front surfaces of the chassis 51 and the side holders 54, and the frame 56 is further placed in front of the optical sheets 55. The LCD panel 10 is placed on a front surface of the frame 56, and the bezel 58 is placed on a front surface of the LCD panel 10.

The light source driving circuit board 60 and the drive control circuit board 59 are placed behind the chassis 51. The light source driving circuit board 60 is electrically connected with each of the light sources 18, and the drive control circuit board 59 is electrically connected with the circuit boards attached to the LCD panel 10'. The light source driving circuit board cover 60*a* is attached so as to cover the light source driving circuit board 60, and the drive control circuit board cover 59*a* is attached so as to cover the drive control circuit board 59.

Figure 12:
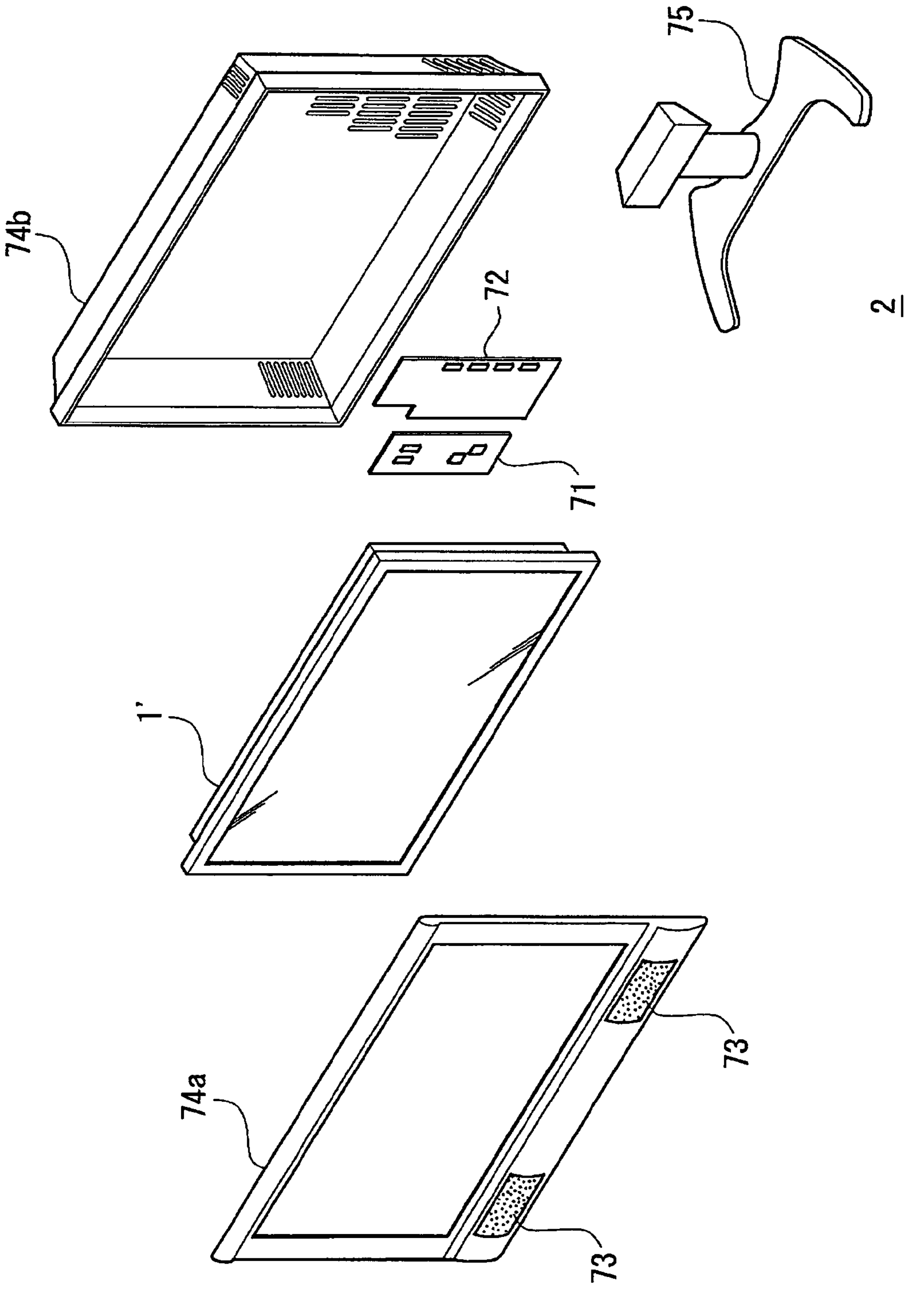
FIG. 12 is an exploded perspective view schematically showing a structure of a television receiver according to a preferred embodiment of the present invention.
Figure 13A:
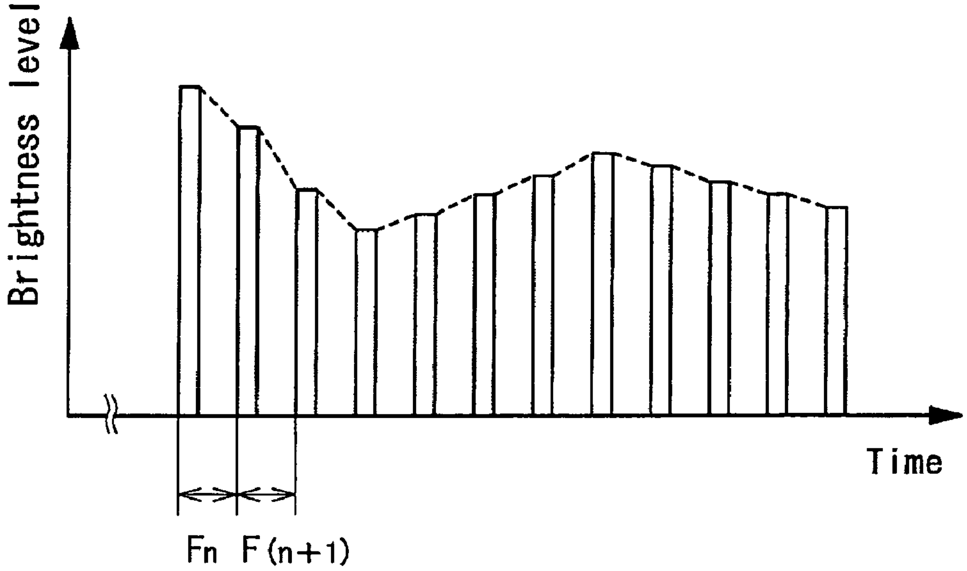
FIG. 13A is a graphic plot of changes in brightness level of a pixel in a conventional impulse-type display device.
Figure 13B:
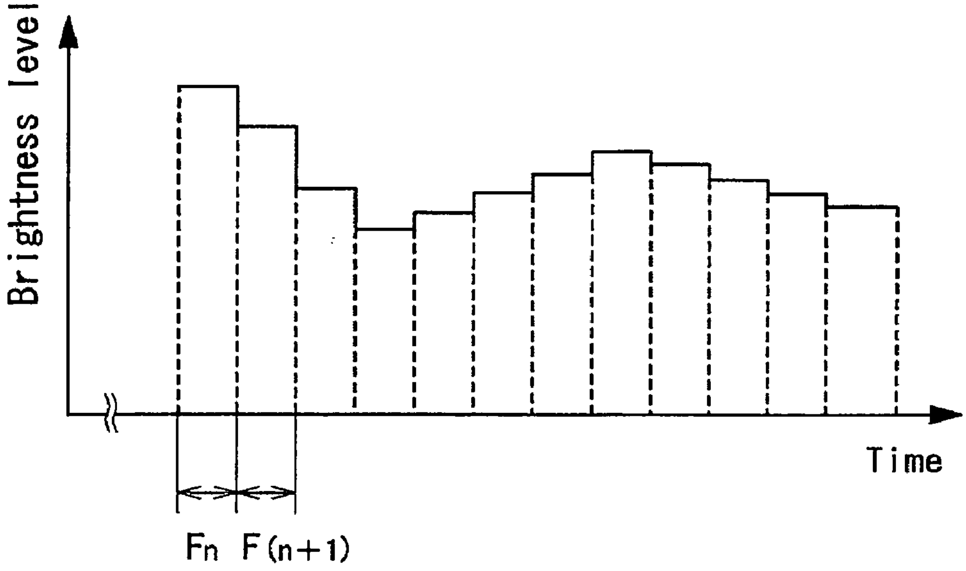
FIG. 13B is a graphic plot of changes in brightness level of a pixel in a conventional hold-type display device.
Figures 14A, 14B:
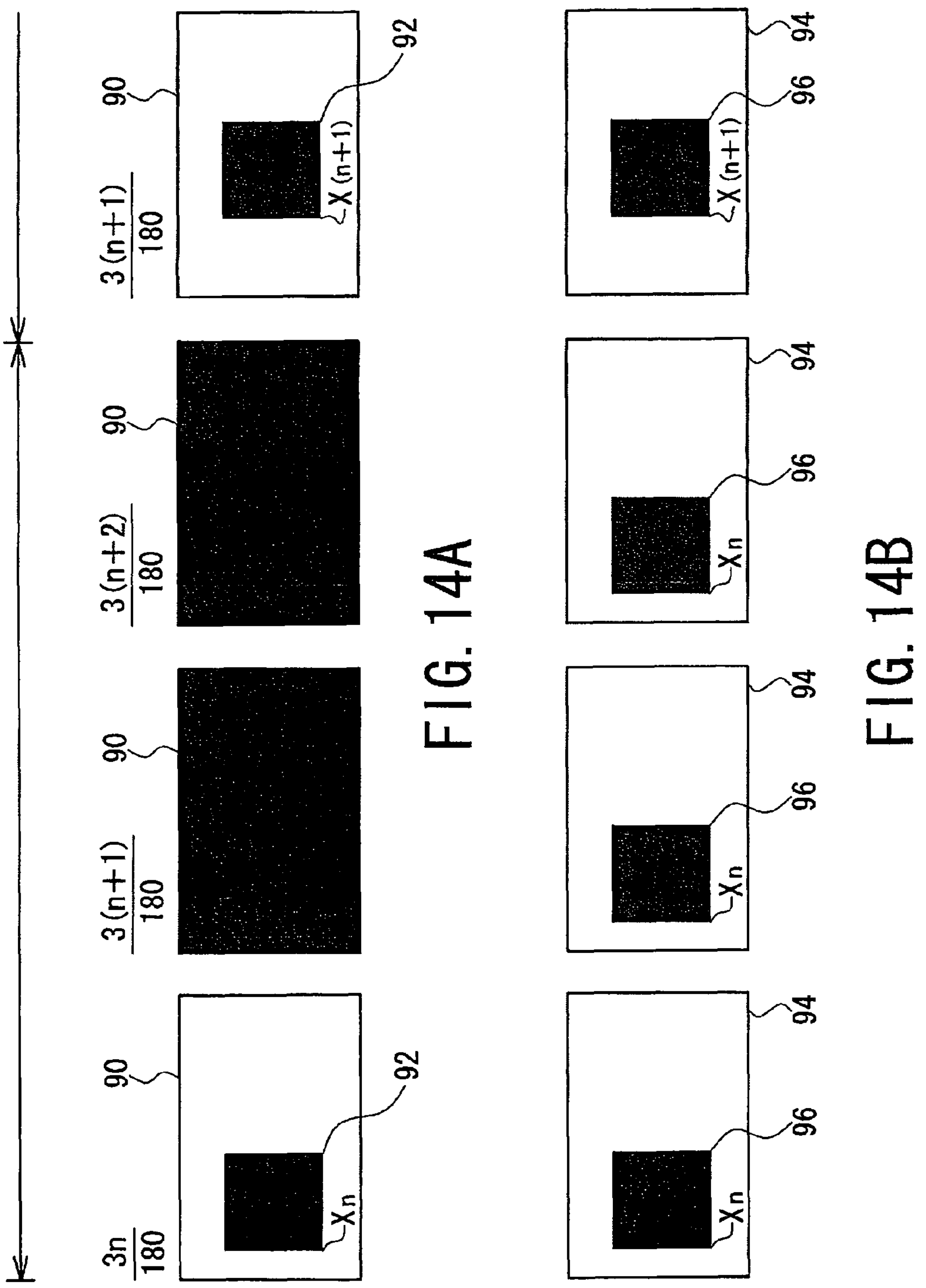
FIG. 14A is a view schematically showing frame-by-frame changes in display state of a display screen of the conventional impulse-type display device.
FIG. 14B is a view schematically showing frame-by-frame changes in display state of a display screen of the conventional hold-type display device.

Next, a description of a television receiver according to a preferred embodiment of the present invention will be provided. FIG. 12 is an exploded perspective view schematically showing the structure of a television receiver 2 according to the present preferred embodiment of the present invention.

As shown in FIG. 12, the television receiver 2 has the display device 1' according to the above-described preferred embodiment of the present invention, a tuner 71, loudspeaker mechanisms 73, an electric power supply 72, a cabinet 74*a*, 74*b*, and a supporting member 75. For the tuner 71, the loudspeaker mechanisms 73, the electric power supply 72, the cabinet 74*a*, 74*b*, and the supporting member 75, conventional ones may be used. Therefore, brief descriptions thereof are given, and detailed descriptions thereof are omitted.

The tuner 71 produces an image signal and a sound signal of a given channel based on received radio waves. For the tuner 71, a conventional terrestrial tuner (analog, digital, or both), a BS tuner or a CS tuner may be used. The loudspeaker mechanisms 73 produce a sound based on the sound signal produced by the tuner 71. For the loudspeaker mechanisms 73, generally used speakers may be used. The electric power supply 72 is capable of supplying electric power to the display device 1' according to the above-described preferred embodiment of the present invention, the tuner 71 and the loudspeaker mechanisms 73.

The display device 1' according to the above-described preferred embodiment of the present invention, the tuner 71, the loud speaker mechanisms 73 and the electric power supply 72 are housed in the cabinet 74*a*, 74*b*, and the cabinet 74*a*, 74*b* is supported by the supporting member 75. In FIG. 12, the cabinet 74*a*, 74*b* consists of a front side cabinet 74*a* and a back side cabinet 74*b*, and between the front and back side cabinets 74*a* and 74*b*, the display device 1', the tuner 71, the loudspeaker mechanisms 73 and the electric power supply 72 are housed. Alternately, the tuner 71, the loud speaker mechanisms 73, and the electric power supply 72 may be mounted on the display device 1'.

According to the television receiver having the above-described configuration, display of a moving image with smooth natural movement can be achieved even in displaying a moving image with fast movement such as a moving image displayed at the time of sports broadcasting, and occurrence of flicker in the display screen can be minimized or prevented.

The foregoing description of the preferred embodiments and the implementation example of the present invention has been presented for purposes of illustration and description with reference to the drawings. However, it is not intended to limit the present invention to the preferred embodiments, and modifications and variations are possible as long as they do not deviate from the principles of the present invention. For example, while a liquid crystal display device is used in the above-described preferred embodiments of the present invention, it is also preferable to use display devices in which an inorganic/organic electro-luminescence or a light-emitting diode is used, or hold-type display devices such as a plasma display device.

What is claimed is:

1. A display device having a display screen in which a plurality of pixels are arranged in a matrix which is driven by inputting image signals for one frame into the display device at established intervals, writing a gray level in accordance with the image signal in each of the pixels; displaying an image on the display screen, and interpolating between a first gray level of each of the pixels in accordance with an image signal inputted in a given frame, and a second gray level of each of the pixels in accordance with an image signal inputted in a next frame, whereby the gray level of each of the pixels continuously changes from the first gray level to the second gray level, the display device comprising:

interpolation mechanisms provided to the individual pixels, each of the interpolation mechanisms arranged to perform the interpolation between the first gray level of the pixel in accordance with the image signal inputted in the given frame, and the second gray level of the pixel in accordance with the image signal inputted in the next frame, whereby the gray level of the pixel continuously changes from the first gray level to the second gray level.

2. The display device according to claim 1, wherein the interpolation is performed between the first gray level and the second gray level by using a linear function.

3. The display device according to claim 1, wherein the interpolation is performed between the first gray level and the second gray level by circular interpolation based on a plurality of gray levels including the first gray level and the second gray level.

4. The display device according to claim 1, wherein the interpolation is performed between the first gray level and the second gray level by selectively using different functions according to a difference between the first gray level and the second gray level.

5. The display device according to claim 1, wherein the interpolation is performed between the first gray level and the second gray level by using different functions depending on whether the gray level goes up or goes down during a period when the gray level changes from the first gray level to the second gray level.

6. The display device according to claim 1, wherein a liquid crystal display panel in which a liquid crystal is sandwiched between a pair of substrates comprises the display screen.

7. The display device according to claim 1, wherein a luminescence display panel in which a luminescent layer is provided between a pair of electrodes comprises the display screen.

8. The display device according to claim 1, wherein light-emitting diodes are arranged in a matrix as the pixels.

9. A television receiver comprising;

a receiving mechanism arranged to receive a broadcast radio wave: and a display mechanism arranged to display a broadcast content of the broadcast radio wave received by the receiving mechanism, wherein the display device according to claim 1 is used as the display mechanism.

10. A television receiver comprising;

a receiving mechanism arranged to receive a broadcast radio wave: and a display mechanism arranged to display a broadcast content of the broadcast radio wave received by the receiving mechanism, wherein the display device according to claim 6 is used as the display mechanism.

11. A television receiver comprising;

a receiving mechanism arranged to receive a broadcast radio wave: and a display mechanism arranged to display a broadcast content of the broadcast radio wave received by the receiving mechanism, wherein the display device according to claim 7 is used as the display mechanism.

12. A television receiver comprising;

a receiving mechanism arranged to receive a broadcast radio wave: and a display mechanism arranged to display a broadcast content of the broadcast radio wave received by the receiving mechanism, wherein the display device according to claim 8 is used as the display mechanism.

* * * * *